US008949111B2

(12) United States Patent
Jakubik (10) Patent No.: US 8,949,111 B2
(45) Date of Patent: Feb. 3, 2015

(54) SYSTEM AND METHOD FOR IDENTIFYING PHRASES IN TEXT (75) Inventor: Paul A. Jakubik, Plano, TX (US)

(73) Assignee: Brainspace Corporation, Dallas, TX (US)

( * ) Notice: Subject to any disclaimer, the term of this patent is extended or adjusted under 35 U.S.C. 154(b) by 478 days.

(21) Appl. No.: 13/326,120

(22) Filed: Dec. 14, 2011

(65) Prior Publication Data
US 2013/0158979 A1 Jun. 20, 2013

(51) Int. Cl.
G06F 17/20 (2006.01)
G06F 17/28 (2006.01)
G06F 17/27 (2006.01)
G06F 17/21 (2006.01)

(52) U.S. Cl.
USPC ............... 704/9; 704/1; 704/2; 704/3; 704/4; 704/5; 704/6; 704/7; 704/8; 704/10

(58) Field of Classification Search
CPC ..... G06F 17/28; G06F 17/2785; G06F 17/21; G06F 17/2765; G06F 17/27; G06F 17/2809; G06F 17/2735; G06F 17/2881; G06F 17/2705; G06F 17/277; G06F 17/278; G06F 17/2818; G06F 17/2872; G06F 17/30613; G06F 17/30752; G10L 15/1815
USPC ....................................................... 704/1–10
See application file for complete search history.

(56) References Cited

U.S. PATENT DOCUMENTS

| 5,721,939 | A | 2/1998 | Kaplan |
| 5,890,103 | A | 3/1999 | Carus |
| 6,182,029 | B1 | 1/2001 | Friedman |
| 6,212,494 | B1 | 4/2001 | Boguraev |
| 6,816,830 | B1 | 11/2004 | Kempe |
| 6,847,966 | B1 * | 1/2005 | Sommer et al. ............... 707/739 |
| 7,574,360 | B2 * | 8/2009 | Wu et al. ........................ 704/260 |
| 8,346,534 | B2 * | 1/2013 | Csomai et al. ..................... 704/1 |
| 8,594,996 | B2 * | 11/2013 | Liang et al. ....................... 704/9 |
| 2003/0069909 | A1 * | 4/2003 | Bellegarda ..................... 707/513 |
| 2005/0015366 | A1 * | 1/2005 | Carrasco et al. ................. 707/3 |
| 2006/0089947 | A1 * | 4/2006 | Gallivan et al. ............... 707/102 |
| 2006/0259481 | A1 * | 11/2006 | Handley ........................... 707/5 |
| 2008/0270120 | A1 | 10/2008 | Pestian et al. |
| 2010/0145678 | A1 * | 6/2010 | Csomai et al. .................... 704/9 |
| 2013/0197900 | A1 * | 8/2013 | Rotbart et al. .................... 704/9 |
| 2014/0142922 | A1 * | 5/2014 | Liang et al. ....................... 704/9 |

OTHER PUBLICATIONS

Bellegarda, J.R.; Butzberger, J.W.; Yen-Lu Chow; Coccaro, N.B.; Naik, D., "A novel word clustering algorithm based on latent semantic analysis," Acoustics, Speech, and Signal Processing, 1996. ICASSP-96. Conference Proceedings., 1996 IEEE International Conference on , vol. 1, no., pp. 172,175 vol. 1, May 7-10, 1996.*
Evans et al., "Mapping Vocabularies Using Latent Semantics", Cross-Language Information Retrieval, The Springer International Series on Information Retrieval, vol. 2, 1998, pp. 63-80.*
Paul A. Jakubik, Continuation Patent Application and Preliminary Amendment, U.S. Appl. No. 13/732,953, filed Jan. 2, 2013, 44 pages.
USPTO, Non-Final Office Action for U.S. Appl. No. 13/732,953 dated Apr. 19, 2013, 5 pages.

* cited by examiner

Primary Examiner — Edgar Guerra-Erazo
(74) Attorney, Agent, or Firm — Baker Botts L.L.P.

(57) ABSTRACT

A method includes accessing text that includes a plurality of words, tagging each of the plurality of words with one of a plurality of parts of speech (POS) tags, and creating a plurality of tokens, each token comprising one of the plurality of words and its associated POS tag. The method further includes clustering one or more of the created tokens into a chunk of tokens, the one or more tokens clustered into the chunk of tokens based on the POS tags of the one or more tokens, and forming a phrase based on the chunk of tokens, the phrase comprising the words of the one or more tokens clustered into the chunk of tokens.

20 Claims, 5 Drawing Sheets

SYSTEM AND METHOD FOR IDENTIFYING PHRASES IN TEXT

TECHNICAL FIELD

This disclosure relates in general to searching of data and more particularly to a system and method for identifying phrases in text.

BACKGROUND

Latent Semantic Analysis ("LSA") is an algorithm that is used in many applications for discovering latent relationships in data. In one such application, LSA is used in the analysis and searching of text documents. Text documents typically contain words and phrases that are identified and passed to LSA for analysis.

SUMMARY OF THE DISCLOSURE

According to one embodiment, a method includes accessing text that includes a plurality of words, tagging each of the plurality of words with one of a plurality of parts of speech (POS) tags, and creating a plurality of tokens, each token comprising one of the plurality of words and its associated POS tag. The method further includes clustering one or more of the created tokens into a chunk of tokens, the one or more tokens clustered into the chunk of tokens based on the POS tags of the one or more tokens, and forming a phrase based on the chunk of tokens, the phrase comprising the words of the one or more tokens clustered into the chunk of tokens.

Technical advantages of certain embodiments may include discovering and identifying meaningful phrases in text while requiring less memory, time, and processing power. This may result in lower overall system requirements to perform LSA on large amounts of input data. Other technical advantages will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present disclosure and its advantages, reference is now made to the following description, taken in conjunction with the accompanying drawings, in which.

DETAILED DESCRIPTION OF THE DISCLOSURE

A standard Latent Semantic Analysis ("LSA") process is capable of accepting and analyzing text such as one or more words, a sentence or paragraph of text, or a document. A first step in typical LSA processes is to identify terms and phrases from the text. A typical solution is to capture all n-grams of words in the text where n is typically in the range of 1-4. For example, consider text of "The brown dog is on the grass." For this text, the n-grams of the word dog where n=3 would be: "The brown dog," "brown dog is," and "dog is on."

While typical n-gram techniques identify numerous phrase candidates, it also has many disadvantages. For example, it produces a large amount of candidate phrases which may slow down processing. This reduction in processing prevents processes from recognizing phrases with more than a certain number of words in them (i.e., four words). In addition, typical n-gram techniques produce phrase fragments such as "a dog", "the dog", "dog in", "dog on", and the like which are undesirable.

The teachings of the disclosure recognize that it would be desirable to quickly and efficiently identify phrases in text. The following describes a system and method for quickly identifying phrases in text, according to certain embodiments.

In general, the disclosed embodiments identify meaningful phrases in text. A lightweight parts-of-speech (POS) tagger that uses a lexicon is utilized by some embodiments to map words to their most likely part of speech. Heuristics are used to improve the original tagging. After mostly accurate POS tags are obtained for each word, a stack of grammar productions that build up hierarchical phrase representation are utilized. Finally, rules are utilized to help determine when to count the entire phrase only, when to count the parts of the phrase only, or when to count both. This produces fewer candidate phrases than typical n-gram processes would, while at the same time properly capturing parts of phrases that are meaningful to humans.

In some embodiments, a tokenizer is utilized before the parts of speech tagger. The tokenizer identifies types such as email addresses, URLs, numbers, acronyms, etc., before the lexicon based tagger is utilized. This improves the tagging accuracy and increases the tagging speed by avoiding trying to tag items when it is already known how to tag the items based on their token type.

In some situations, nouns present an especially difficult challenge for typical phrase identifiers. Typical POS taggers lump all nouns together as a single type. A more advanced set of tags, such as the well-known PENN TREEBANK TAG-SET, identifies certain types of nouns, but is still lacking. Certain of the enclosed embodiments utilize a richer set of noun tags to overcome undifferentiated blocks of nouns such as "New York City Mayor Michael Bloomberg." To a human, it is easy to see that "New York City" is a place, and "Mayor Michael Bloomberg" is a person. However, given the parts of speech typical POS taggers can identify, this phrase would usually be identified as a long list of proper nouns. Certain embodiments utilize lists of person names, place names, and other names that can be both a person and a place. Each of these lists are of individual words that could be person or place names, not full names of a person or place. Certain embodiments utilize these lists to apply the following enhanced tags to words:

NNPG: Proper Noun geo name
NNPGP: Proper Noun geo or person name
NNPP: Proper Noun person name In addition to adding these tags to words, certain embodiments utilize special processing to clump nouns together. For example, people names or place names may be clumped together. Handling clumps of names that could be a person or place require special processing based on surrounding nouns. For example, if a person or geo name is before or after a clump of terms that could be either, then all the terms are clumped together and take on the more specific type. The result is that a phrase like "New York City Mayor Michael Bloomberg" is seen by the system as a conjunction of "New York City", "Mayor", and "Michael Bloomberg". These separate phrases, and the super-phrase made by joining the three is much more useful for the kind of analysis performed by LSA than a single undifferentiated block or N-grams of words taken from that block. FIGS. 1-4 below provide more details on how example embodiments create these separate phrases.

Figure 1:
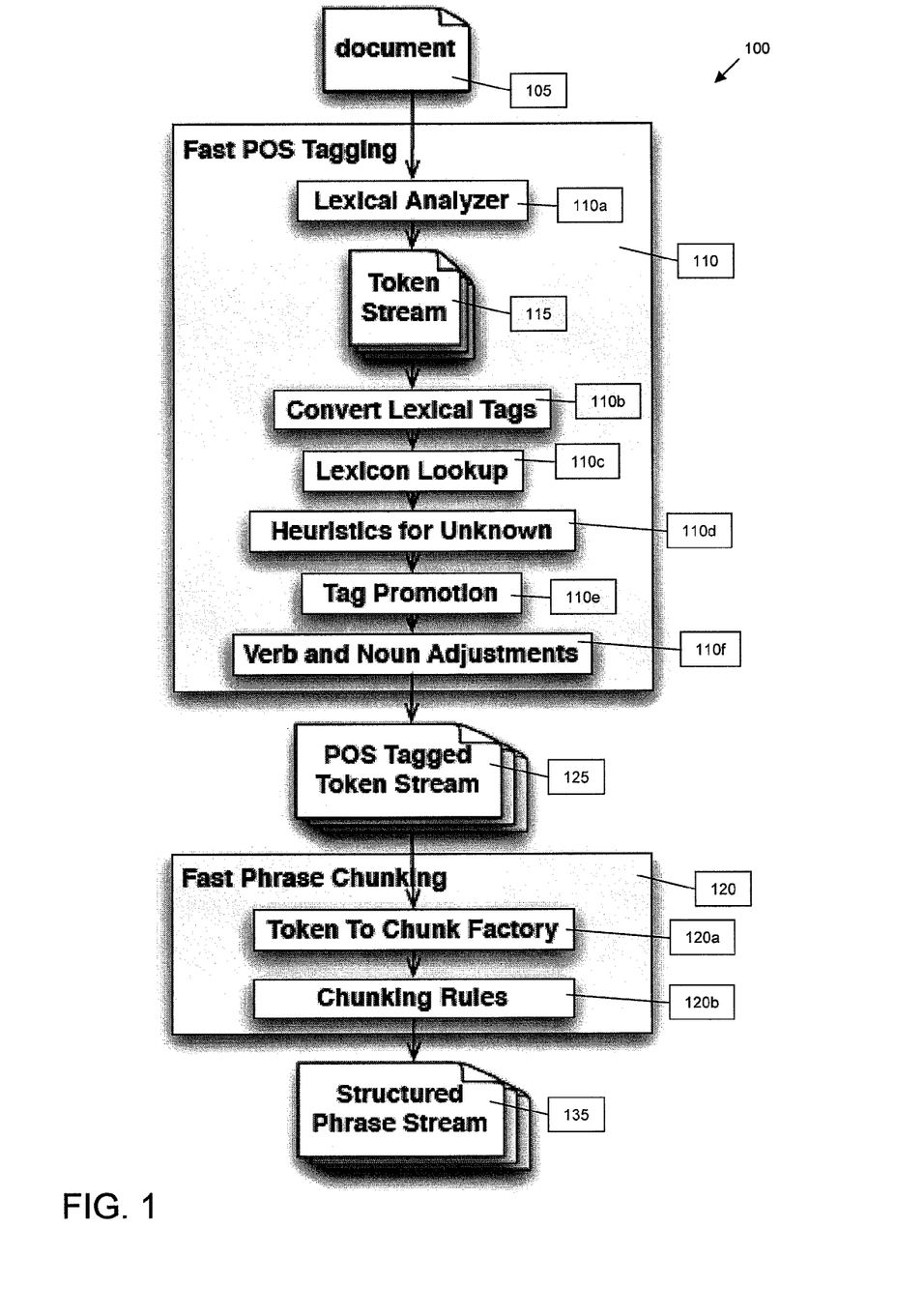
FIG. 1 is a chart depicting a method for identifying phrases in text, according to certain embodiments.

FIG. 1 is a chart depicting a method 100 for identifying phrases in text. Method 100 includes main steps 110 and 120. Step 110, which is described in more detail below, accesses and/or receives text 105 and outputs parts of speech ("POS") tagged tokens 125. Text 105 may be one or more words, a sentence or a paragraph of text, or a document containing text. Step 120, which is described in more detail below, accesses/receives POS tagged tokens 125 and outputs phrase chunks 135.

Method 100 begins in step 110 where text 105 is accessed or received. In certain embodiments, text 105 is first passed to a lexical analyzer 110a. Lexical analyzer 110a analyzes each word in text 105 and attempts to match each word with a specific entity from a list of known entities. For example, the following is a list of entities that certain embodiments of lexical analyzer 110a utilize in order to identify each word in text 105:

Alphanumeric (including common abbreviations and special words like "c#", "c++", and ".net")
Alphanumeric that contains apostrophes
Acronyms
Initials
Prefix (e.g. "Mr.", "Ms.", "Dr.", etc.)
Company (alphanumerics with embedded "&" such as "AT&T" or "P&G"
Email
Hostname
Numeric (numbers optionally including currency symbols)
Kanji
Breaking whitespace (families of whitespace that should break phrases: three or more spaces, two or more newlines, one tab or form feed, etc.)
Breaking punctuation
URL
Comma
Other (anything that is not whitespace, and is not one of the other categories)

In certain embodiments, lexical analyzer 110a captures many forms of punctuation that does not break a phrase, such as '.' at the end of prefixes, in emails, in hostnames, in numbers, or in acronyms. In addition, some embodiments of lexical analyzer 110a differentiate between whitespace that can be inside a phrase and whitespace that should break a phrase. Avoiding false breaks in phrases and false phrases that should not exist are both important in identifying high quality phrases.

If lexical analyzer 110a is able to match words from text 105 with one of the entities from the list of entities, a token 115 that associates the matched entity with a tag of the entity is created. For example, if a word "www.google.com" is matched to the URL entity that has a tag of "URL," a token 115 of "www.google.com:URL" may be created.

In certain embodiments, method 100 includes a lexical tag converter 110b. Lexical tag converter 110b determines if the tag applied to each word of text 105 by lexical analyzer 110a is sufficient for selecting a POS tag, or if the tag is still unknown. In certain embodiments, the POS tags include standard POS types such as those found in the PENN TREEBANK POS Tags, as well as non-standard tags created for use by certain embodiments. For example, the following are POS tags that may be applied to each word of text 105 by lexical tag converter 110b.

NN Noun, singular or mass
NNP Proper Noun, singular
NNPS Proper Noun, plural
NNS Noun, plural
NNA Proper Noun acronym
NNC Proper Noun company name
NNE Proper Noun email address
NNH Proper Noun host name
NNPH Proper Noun Honorific
NNTN Noun, twitter name
NNTT Noun, twitter tag
NNU Noun, URL
INDT—preposition determiner—equivalent to "of the". Sometimes found as a single word in foreign languages
NNI—noun initial—used for tokens that could be initials as part of a person's name
NNPG—Proper noun geo name
NNPGP—Proper noun geo or person name
NNPP—Proper noun person name As an example, lexical tag converter 110b may receive token 115 of "www.google.com:URL" as described above and determine that the word "www.google.com" should be matched to POS tag "NNU Noun, URL."

In certain embodiments, method 100 includes lexicon lookup process 110c. Lexicon lookup process 110c determines if words from text 105 have been matched to a POS tag by lexical analyzer 110a and lexical tag converter 110b. If lexicon lookup process 110c determines that a POS tag has not already been matched to a word, lexicon lookup process 110c attempts to map the word to POS tags from a lexicon. To do so, lexicon lookup process 110c may first access any appropriate lexicon (i.e., an online lexicon) that maps words to POS tags. In certain embodiments, lexicon lookup process 110c performs a case sensitive lookup. If that effort fails, some embodiments of lexicon lookup process 110c perform a case insensitive lookup to find a POS tag candidate.

In certain embodiments, method 100 includes heuristics process 110d. Heuristics process 110d may be employed if the POS tag is still unknown for a word after passing through lexical analyzer 110a and lexicon lookup process 110c. Heuristics process 110d applies a set of heuristics to determine the POS for words from text 105. For example, the following set of nine heuristics may be utilized by certain embodiments of heuristics process 110d to determine the POS tag:

1. If the token 115 contains a number, tag as "cardinal number".
2. Otherwise if the token 115 ends with "ed", tag as "verb past participle".
3. Otherwise if the token 115 ends with "ly", tag as "adverb".
4. Otherwise if the token 115 ends with "al", "ic", "less", or "like", tag as "adjective".
5. Otherwise if the token 115 ends with "ing", tag as "verb, gerund or present participle".
6. Otherwise if the token 115 ends with "the", tag as "determiner". (A typical error is no space before "the".)
7. Otherwise if the token 115 is a legal roman numeral, tag as "cardinal number".
8. Otherwise if the first character of the token 115 is a letter, tag as "plural noun" if the token ends in 's', or "noun" if it does not end in 's'.
9. Otherwise tag as "symbol".

In certain embodiments, method 100 includes a tag promoter 110e. Tag promoter 110e utilizes additional heuristics for making small tag type changes. For example, certain embodiments of tag promoter 110e utilize the following heuristics:

1. If tagged as "noun" and first character is upper case or title case, change tag to "proper noun".
2. If tagged as "plural noun" and first character is upper case or title case, change tag to "plural proper noun".
3. If tagged as any of the "noun" types, and the tag for the previous token was "modal" (would, could, etc.), change to "verb".

In certain embodiments, method 100 includes a verb and noun adjuster 110f. Verb and noun adjuster 110f utilizes certain heuristics for changing some verbs to nouns and some nouns to verbs. For example, some embodiments of verb and noun adjuster 110f utilize the following heuristics:

1. If the previous token 115 was tagged as a "determiner" and the current token 115 is a VB, VBD, or VBP, make the current token 115 a "noun".
2. If the previous token 115 is "to" and the current token 115 is a "noun" that is not capitalized, make the current token 115 a "verb".

In step 120, fast phrase chunking is performed by a phrase aware generative grammar using a stack of non-recursive productions, and a factory that provides initial groupings of words prior to applying generative grammar rules. In certain embodiments, the grammar rules are applied in order as matches are found.

Figure 2:
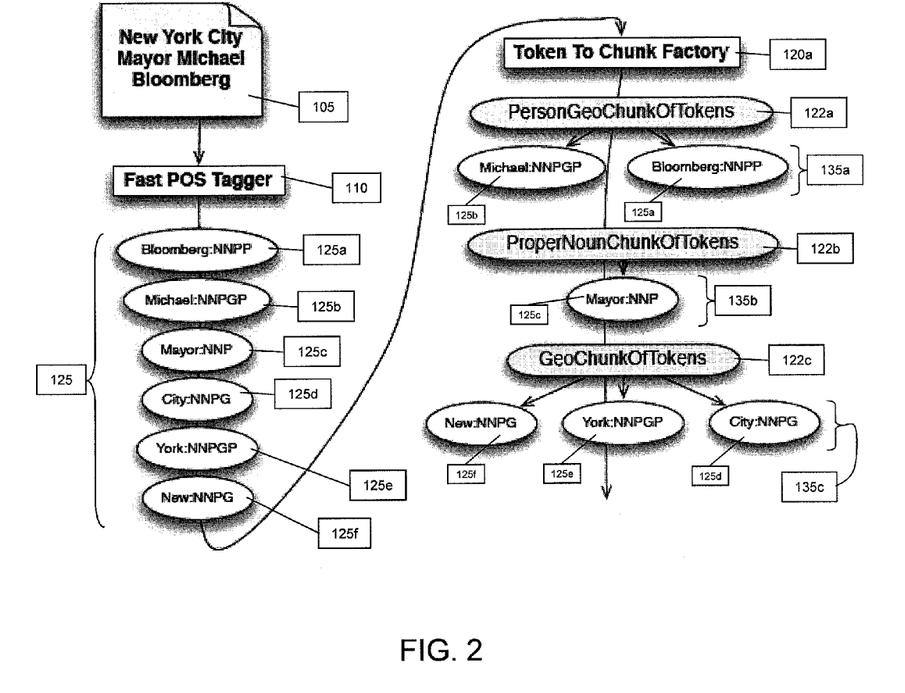
FIG. 2 is a chart depicting additional details of the method of FIG. 1, according to certain embodiments.

The fast phrase chunking of step 120 works together with the extended noun tags provided by the fast POS tagging system of step 110 to separate people, places, and other nouns from each other more quickly than more standard algorithms allow. For example, the phrase "New York City Mayor Michael Bloomberg" contains people and place nouns. FIG. 2, discussed in more detail below, illustrates this phrase passing through both the fast POS tagging system of step 110 and token-to-chunk factory 120a of step 120.

FIG. 2 illustrates an example phrase passing from fast POS tagging system of step 110 through token-to-chunk factory 120a. As illustrated in this figure, the fast POS tagger of step 110 first produces POS tagged tokens 125a. Each POS tagged token 125 includes a value (e.g., a word) and a type (e.g., a tag). For example, for the phrase "New York City Mayor Michael Bloomberg", the following POS tagged tokens 125 are produced by fast POS tagging system of step 110:

POS tagged token 125a: "Bloomberg:NNPP"
POS tagged token 125b: "Michael:NNPGP"
POS tagged token 125c: "Mayor:NNP"
POS tagged token 125d: "City:NNPG"
POS tagged token 125e: "York:NNPGP"
POS tagged token 125f: "New:NNPG"

The types used in FIG. 2 are as follows:
NNP—A proper noun
NNPG—A proper noun for a geographic location
NNPGP—A proper noun that could be for a geographic location or a person
NNPP—A proper noun for a person In some embodiments, POS tagged tokens 125 generated by step 110 are received and/or accessed by token-to-chunk factory 120a. Token-to-chunk factory 120a determines which types of words should be grouped as phrases, and which types should be treated separately. In the illustrated case of FIG. 2, with POS tagged tokens 125a-125f all containing proper nouns, all of the words could be grouped together as a single phrase. However, the extended POS types are used by token-to-chunk factory 120a to identify useful sub-phrases, as explained in more detail below.

The first POS tagged tokens 125 that token-to-chunk factory 120a sees is POS tagged token 125f of "New:NNPG". POS tagged token 125f is determined by token-to-chunk factory 120a to be a proper noun for a geographic location due to its tag of "NNPG." As a result, token-to-chunk factory 120a creates a chunk of tokens 122c of "GeoChunkOfTokens" for POS tagged token 125f. Next, token-to-chunk factory 120a peeks ahead at the stream of POS tagged tokens 125 to see how many other POS tagged tokens 125 can be included in "GeoChunkOfTokens" 122c that it just created. "York:NNPGP" 125e is determined to be a proper noun token that could be for a person or geographic location, and is therefore added to "GeoChunkOfTokens" 122c. "City:NNPG" 125d is also determined to be another geographic proper name and is therefore added to "GeoChunkOfTokens" 122c.

The next POS tagged token 125, "Mayor:NNP" 125c, is determined by token-to-chunk factory 120a to not be a candidate for a geographic proper name because its tag, "NNP," indicates "a proper noun" but does not indicate a geographic location. Thus, instead of adding this token to "GeoChunkOfTokens" 122c, a chunk of tokens 122b of "ProperNounChunkOfTokens" is created by token-to-chunk factory 120a. Just as it did for "GeoChunkOfTokens" 122c, the factory looks ahead in the stream of POS tagged tokens 125 to see if there are more proper nouns that can be added to "ProperNounChunkOfTokens" 122b. The next POS tagged tokens 125b of "Michael:NNPGP" is determined to be a proper noun, but it is more specifically a proper noun that could be naming a specific geographic location or person. Therefore, token-to-chunk factory 120a does not add "Michael:NNPGP" 125b to "ProperNounChunkOfTokens" 122b. Since "Michael:NNPGP" 125b could be part of a person or place name, a chunk of tokens 122a of "PersonGeoChunkOfTokens" is created by token-to-chunk factory 120a. At the time "PersonGeoChunkOfTokens" 122a is created, people proper nouns, place proper nouns, or proper nouns that could be either can be added to it.

Figure 3A:
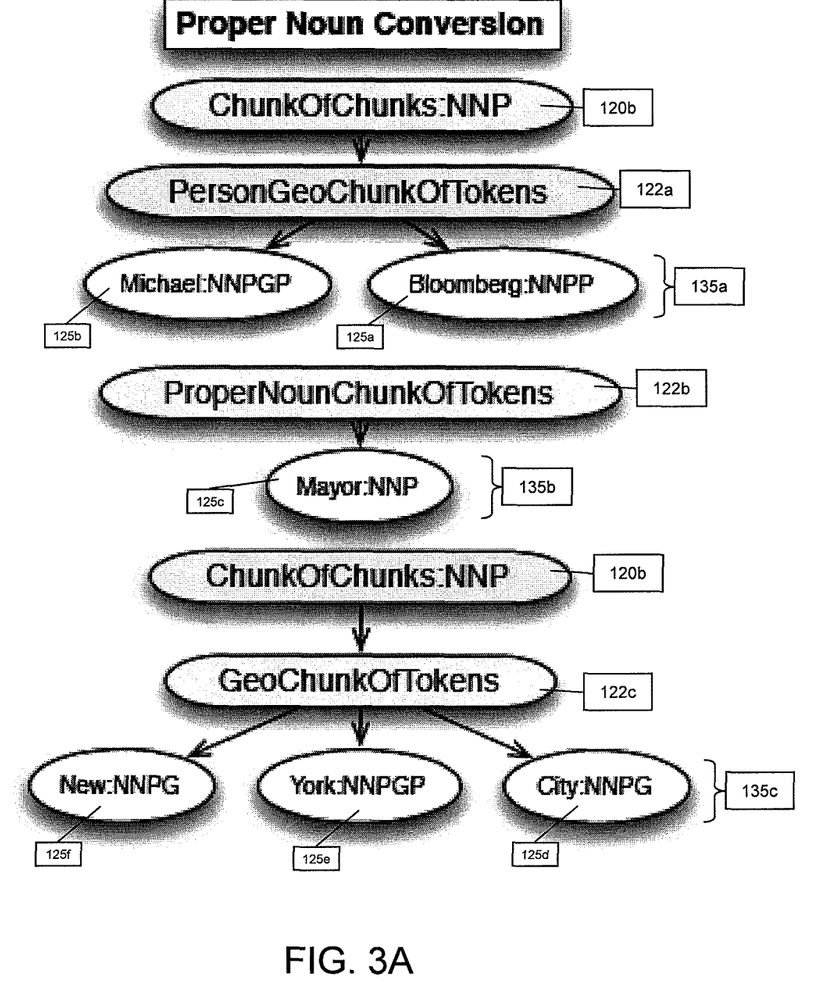
FIGS. 3A and 3B are charts depicting additional details of the method of FIG. 1, according to certain embodiments.
Figure 3B:
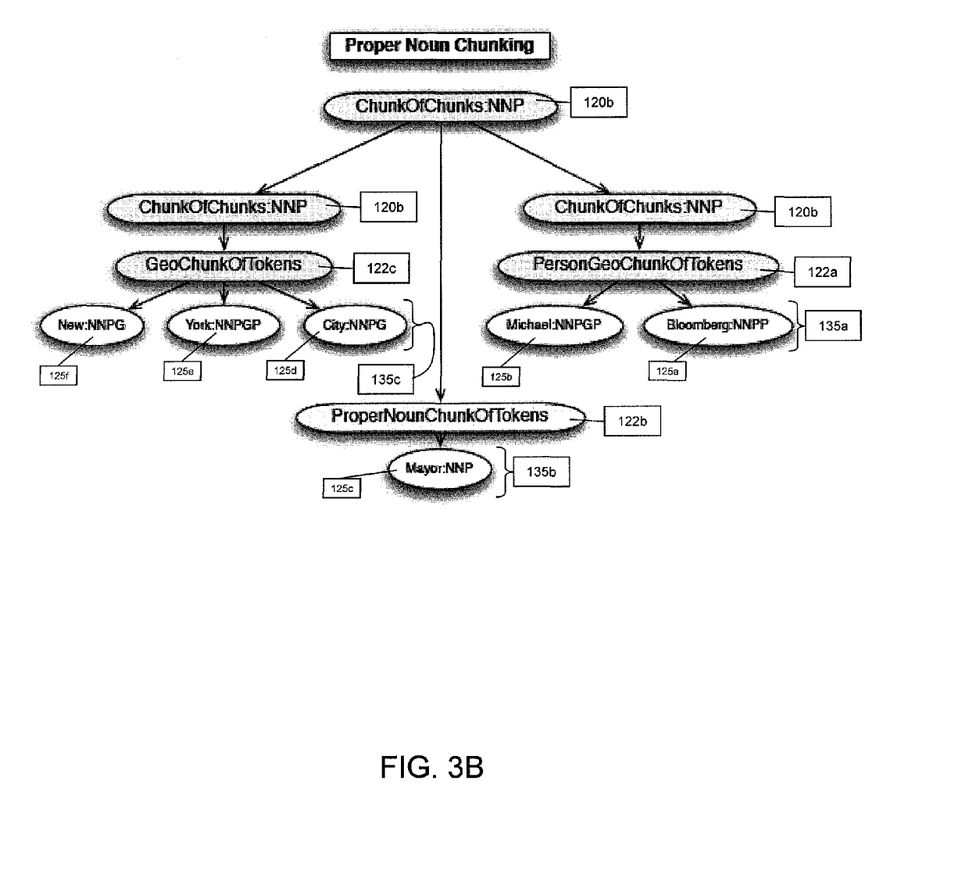

The next POS tagged token 125, "Bloomberg:NNPP" 125a, changes the behavior of "PersonGeoChunkOfTokens" 122a. Since "Bloomberg:NNPP" 125a can only be a person proper noun (as determined by its tag of "NNPP"), once it is added to "PersonGeoChunkOfTokens" 122a by token-to-chunk factory 120a, that particular chunk of tokens 122 will only accept additional proper nouns that could be proper nouns for a person. After all POS tagged tokens 125a-125f have been processed by token-to-chunk factory 120a, the POS tagged tokens 125 of each chunk of tokens 122 are grouped into phrase chunks 135. For the illustrated example in FIG. 2, the following phrase chunks 135 are created:

phrase chunk 135a: "Michael Bloomberg":NNPP
phrase chunk 135b: "Mayor":NNP
phrase chunk 135c: "New York City":NNPG FIGS. 3A and 3B illustrate chunking rules 120b that may be utilized by the phase phrase chunking of step 120 of method 100. Most of the productions in grammar are binary or trinary productions. An example binary production is X+Y->Z, which indicates a rule that if a type "X" is found in the chunk stream followed by something with type "Y", replace those two chunks with a single chunk of type "Z" that contains "X" and "Y". Similarly, an example trinary production is: W+X+Y->Z, which indicates a rule that if types "W", "X", and "Y" are found adjacent to each other and in that order in the chunk stream, replace them with a chunk of type "Z" that contains the "W", "X", and "Y". Some examples are illustrated below:

NNPP+NNI+NNPP->NNPP (e.g. "John", "Q.", "Smith" can be grouped together as "John Q. Smith" and given type NNPP)

NNI+NNPP->NNPP (e.g. "J. K." "Rowling" can be grouped together as "J. K. Rowling" and given type NNPP)

While these kinds of productions are common in the grammar, there are other types as well. When it comes to dealing with proper nouns, an important kind of production rule is one that converts one type to another, usually used to convert from a specific type, to a more general type. For our example, the following two production rules 120b are important:

NNPG->NNP
NNPP->NNP

FIGS. 3A and 3B illustrate these production rules 120b being implemented on the phrase chunks 135 discussed above in FIG. 2. After converting the more specific proper noun phrase chunks 135 in the stream, the phrase chunks 135 have the same type as illustrated below:

phrase chunk 135a: "Michael Bloomberg":NNP
phrase chunk 135b: "Mayor":NNP
phrase chunk 135c: "New York City":NNP Another production that doesn't fit the binary and trinary production model is one used for proper noun grouping. In this case a production is used that groups as many adjacent proper nouns together as it can. After grouping proper nouns together, our original phrase "New York City Mayor Michael Bloomberg" is reconstructed as a proper noun phrase.

The disclosed methods of identifying phrases and subphrases provide numerous advantages. One advantage is that the words and phrases in documents such as text 105 are more easily and accurately identified and counted. In certain embodiments, for example, method 100 provides a count of the number of the words in text 105 that is based on the number of POS tagged tokens 125. These improved word and phrase counts improve the clustering and LSA results for subsequent processes. In the discussed example above, "New York City Mayor Michael Bloomberg", a typical n-gram word and phrase statistics processes, where n is 2 or 3, would have produced the following list of phrases:

New York City
York City Mayor
City Mayor Michael
Mayor Michael Bloomberg
New York
York City
City Mayor
Mayor Michael
Michael Bloomberg Some of these phrases are meaningful to a human being, and some are not. By using the fast POS tagging and fast phrase chunking of method 100 discussed above, the following phrases were produced in roughly the same amount of time it would take to produce n-grams:

New York City Mayor Michael Bloomberg
New York City
Michael Bloomberg

As a result, fewer phrases that are meaningful to human beings are produced.

Figure 4:
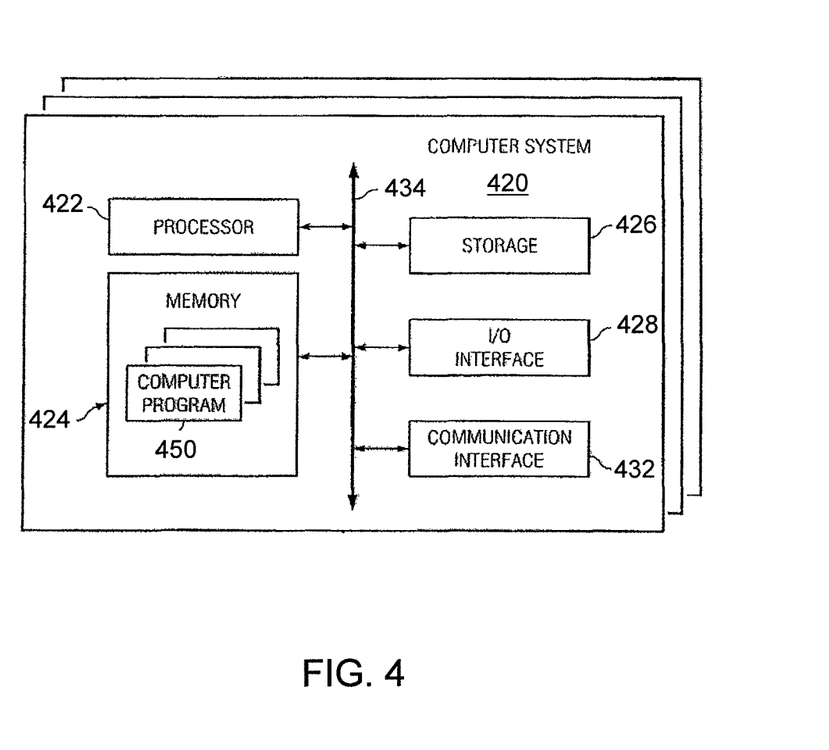
FIG. 4 is a system where particular embodiments of the disclosure may be implemented.

FIG. 4 is block diagram illustrating a portion of a processing/computing system 420 that may be used to discover latent relationships in data according to one embodiment. Computing system 420 performs one or more steps of one or more methods described or illustrated herein. In particular embodiments, one or more computing systems 420 provide functionality described or illustrated herein. In particular embodiments, software running on one or more computing systems 420 (i.e., a computer program 450) performs one or more steps of one or more methods described or illustrated herein or provides functionality described or illustrated herein. Particular embodiments include one or more portions of one or more computing systems 420.

Computing system 420 may be in any suitable physical form. As example and not by way of limitation, computing system 420 may be a virtual machine (VM), an embedded computer system, a system-on-chip (SOC), a single-board computer system (SBC) (e.g., a computer-on-module (COM) or system-on-module (SOM)), a desktop computer system, a laptop or notebook computer system, an interactive kiosk, a mainframe, a mesh of computer systems, a server, an application server, or a combination of two or more of these. Where appropriate, computing system 420 may include one or more computing systems 420; be unitary or distributed; span multiple locations; span multiple machines; or reside in a cloud, which may include one or more cloud components in one or more networks. Where appropriate, one or more computing systems 420 may perform without substantial spatial or temporal limitation one or more steps of one or more methods described or illustrated herein. As an example and not by way of limitation, one or more computing systems 420 may perform in real time or in batch mode one or more steps of one or more methods described or illustrated herein. One or more computing systems 420 may perform at different times or at different locations one or more steps of one or more methods described or illustrated herein, where appropriate.

In some embodiments, computing system 420 may execute any suitable operating system such as IBM's zSeries/Operating System (z/OS), MS-DOS, PC-DOS, MAC-OS, WINDOWS, UNIX, OpenVMS, an operating system based on LINUX, or any other appropriate operating system, including future operating systems. In some embodiments, computing system 420 may be a web server running web server applications such as Apache, Microsoft's Internet Information Server™, and the like.

In particular embodiments, computing system 420 includes a processor 422, memory 424, storage device 426, an input/output (I/O) interface 428, a communication interface 432, and a bus 434. Although this disclosure describes and illustrates a particular computing system 420 having a particular number of particular components in a particular arrangement, this disclosure contemplates any suitable computing system 420 having any suitable number of any suitable components in any suitable arrangement.

In particular embodiments, processor 422 includes hardware for executing instructions, such as those making up computer program 450. As an example and not by way of limitation, to execute instructions, processor 422 may retrieve (or fetch) the instructions from an internal register, an internal cache, memory 424, or storage device 426; decode and execute the instructions; and then write one or more results to an internal register, an internal cache, memory 424, or storage device 426. In particular embodiments, processor 422 may include one or more internal caches for data, instructions, or addresses. This disclosure contemplates processor 422 including any suitable number of any suitable internal caches, where appropriate. As an example and not by way of limitation, processor 422 may include one or more instruction caches, one or more data caches, and one or more translation lookaside buffers (TLBs). Instructions in the instruction caches may be copies of instructions in memory 424 or storage device 426, and the instruction caches may speed up retrieval of those instructions by processor 422. Data in the data caches may be copies of data in memory 424 or storage device 426 for instructions executing at processor 422 to operate on; the results of previous instructions executed at processor 422 for access by subsequent instructions executing at processor 422 or for writing to memory 424 or storage device 426; or other suitable data. The data caches may speed up read or write operations by processor 422. The TLBs may speed up virtual-address translation for processor 422. In particular embodiments, processor 422 may include one or more internal registers for data, instructions, or addresses. This disclosure contemplates processor 422 including any suitable number of any suitable internal registers, where appropriate. Where appropriate, processor 422 may include one or more arithmetic logic units (ALUs); be a multi-core processor; or include one or more processors 422. Although this disclosure describes and illustrates a particular processor, this disclosure contemplates any suitable processor.

In particular embodiments, memory 424 includes main memory for storing instructions such as computer program 450 for processor 422 to execute, or data such as text 105 for processor 422 to operate on. As an example and not by way of limitation, computer system 420 may load instructions from storage device 426 or another source (e.g., another computing system 420) to memory 424. Processor 422 may then load the instructions from memory 424 to an internal register or internal cache. To execute the instructions, processor 422 may retrieve the instructions from the internal register or internal cache and decode them. During or after execution of the instructions, processor 422 may write one or more results (which may be intermediate or final results) to the internal register or internal cache. Processor 422 may then write one or more of those results to memory 424. In particular embodiments, processor 422 executes only instructions in one or more internal registers or internal caches or in memory 424 (as opposed to storage device 426 or elsewhere) and operates only on data in one or more internal registers or internal caches or in memory 424 (as opposed to storage device 426 or elsewhere). One or more memory buses 434 (which may each include an address bus and a data bus) may couple processor 422 to memory 424. Bus 434 may include one or more memory buses, as described below. In particular embodiments, one or more memory management units (MMUs) reside between processor 422 and memory 424 and facilitate accesses to memory 424 requested by processor 422.

In certain embodiments, instructions executed by processor 422 may reside in one or more computer programs 450. A computer program generally refers to instructions, logic, rules, algorithms, code, tables, or other suitable instructions for performing the described functions and operations. In some embodiments, computer program 450 may be stored in memory 424, storage device 426, or any other location accessible to computing system 420. Where appropriate, a computer program may include one or more computer programs; be unitary or distributed; span multiple locations; span multiple machines; or reside in a cloud.

In particular embodiments, storage device 426 includes mass storage for data or instructions. As an example and not by way of limitation, storage device 426 may include an HDD, a floppy disk drive, flash memory, an optical disc, a magneto-optical disc, magnetic tape, a Universal Serial Bus (USB) drive, a solid-state drive (SSD), or a combination of two or more of these. Storage device 426 may include removable or non-removable (or fixed) media, where appropriate. Storage device 426 may be internal or external to computing system 420, where appropriate. In particular embodiments, storage device 426 is non-volatile, solid-state memory. In particular embodiments, storage device 426 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates storage device 426 taking any suitable physical form. Storage device 426 may include one or more storage control units facilitating communication between processor 422 and storage device 426, where appropriate. Where appropriate, storage device 426 may include one or more storage device 426. Although this disclosure describes and illustrates particular storage, this disclosure contemplates any suitable storage.

In particular embodiments, I/O interface 428 includes hardware, software, or both providing one or more interfaces for communication between computing system 420 and one or more I/O devices. System 420 may include one or more of these I/O devices, where appropriate. One or more of these I/O devices may enable communication between a user and computing system 420. As an example and not by way of limitation, an I/O device may include a keyboard, keypad, microphone, monitor, mouse, printer, scanner, speaker, still camera, stylus, tablet, touchscreen, trackball, video camera, sensor, another suitable I/O device or a combination of two or more of these. This disclosure contemplates any suitable I/O devices and any suitable I/O interfaces 428 for them. Where appropriate, I/O interface 428 may include one or more devices or software drivers enabling processor 422 to drive one or more of these I/O devices. I/O interface 428 may include one or more I/O interfaces 428, where appropriate. Although this disclosure describes and illustrates a particular I/O interface 428, this disclosure contemplates any suitable I/O interface 428.

In particular embodiments, communication interface 432 includes hardware, software, or both providing one or more interfaces for communication (e.g., packet-based communication and facsimile communication) between computing system 420 and one or more other computing systems 420. As an example and not by way of limitation, communication interface 432 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 432 for it. As an example and not by way of limitation, computing system 420 may communicate with an ad hoc network, a personal area network (PAN), a local area network (LAN), a wide area network (WAN), a metropolitan area network (MAN), one or more portions of the Internet, a PSTN, or a combination of two or more of these. One or more portions of one or more of these networks may be wired or wireless. As an example, computing system 420 may communicate with a wireless PAN (WPAN) (e.g., a BLUETOOTH WPAN), a WI-FI network, a WI-MAX network, a cellular telephone network (e.g., a Global System for Mobile Communications (GSM) network), or other suitable wireless network or a combination of two or more of these. Computing system 420 may include any suitable communication interface 432 for any of these networks, where appropriate. Communication interface 432 may include one or more communication interfaces 31, where appropriate. Although this disclosure describes and illustrates a particular communication interface, this disclosure contemplates any suitable communication interface.

In particular embodiments, bus 434 includes hardware, software, or both coupling components of computing system 420 to each other. As an example and not by way of limitation, bus 434 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or another suitable bus or a combination of two or more of these. Bus 434 may include one or more buses 434, where appropriate. Although this disclosure describes and illustrates a particular bus, this disclosure contemplates any suitable bus or interconnect.

The components of system 420 may be integrated or separated. In some embodiments, components of system 420 may each be housed within a single chassis. The operations of system 420 may be performed by more, fewer, or other components. Additionally, operations of system 420 may be performed using any suitable logic that may comprise software, hardware, other logic, or any suitable combination of the preceding.

[1] Herein, reference to a computer-readable storage medium encompasses one or more non-transitory, tangible computer-readable storage media possessing structure. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a SSD, a RAM-drive, a SECURE DIGITAL card, a SECURE DIGITAL drive, or another suitable computer-readable storage medium or a combination of two or more of these, where appropriate. A computer-readable non-transitory storage medium may be volatile, non-volatile, or a combination of volatile and non-volatile, where appropriate.

[2] Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

This disclosure encompasses all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A system for discovering latent relationships in data, the system comprising:
    one or more memory units configured to store a plurality of noun tags; and
    one or more processing units operable to:
        access a phrase comprising a plurality of nouns;
        create a plurality of tokens, each token comprising one of the plurality of nouns and an associated noun tag of the plurality of noun tags;
        cluster one or more of the created tokens into a chunk of tokens, the one or more tokens clustered into the chunk of tokens based on the noun tags of the one or more tokens;
        form one or more sub-phrases of the accessed phrase based on the chunk of tokens, the one or more sub-phrases comprising the nouns of the one or more tokens clustered into the chunk of tokens; and
        perform Latent Semantic Analysis (LSA) using the one or more sub-phrases.

2. The system of claim 1, wherein the plurality of noun tags comprises:
    a noun tag for a proper noun that is a geographic name;
    a noun tag for a proper noun that is a name of a person; and
    a noun tag for a proper noun that can be both a geographic name and a name of a person.

3. The system of claim 1, wherein clustering one or more of the created tokens into the chunk of tokens comprises clustering tokens having the same noun tags into the chunk of tokens.

4. A computer-implemented method system for discovering latent relationships in data, the method comprising:
    accessing a phrase by a processing system, the text comprising a plurality of nouns;
    creating, by the processing system, a plurality of tokens, each token comprising one of the plurality of nouns and an associated noun tag of a plurality of noun tags;
    clustering, by the processing system, one or more of the created tokens into a chunk of tokens, the one or more tokens clustered into the chunk of tokens based on the noun tags of the one or more tokens;
    forming, by the processing system, one or more sub-phrases of the accessed phrase based on the chunk of tokens, the one or more sub-phrases comprising the nouns of the one or more tokens clustered into the chunk of tokens; and
    performing, by the processing system, Latent Semantic Analysis (LSA) using the one or more sub-phrases.

5. The computer-implemented method of claim 4, wherein the plurality of noun tags comprises:
    a noun tag for a proper noun that is a geographic name;
    a noun tag for a proper noun that is a name of a person; and
    a noun tag for a proper noun that is can be both a geographic name and a name of a person.

6. The computer-implemented method of claim 4, wherein clustering one or more of the created tokens into the chunk of tokens comprises clustering tokens having the same noun tags into the chunk of tokens.

7. A non-transitory computer-readable medium comprising software, the software when executed by one or more processing units operable to perform operations comprising:
    accessing a phrase comprising a plurality of nouns;
    creating a plurality of tokens, each token comprising one of the plurality of nouns and an associated noun tag of a plurality of noun tags;
    clustering one or more of the created tokens into a chunk of tokens, the one or more tokens clustered into the chunk of tokens based on the noun tags of the one or more tokens;
    forming one or more sub-phrases of the accessed phrase based on the chunk of tokens, the one or more sub-phrases comprising the nouns of the one or more tokens clustered into the chunk of tokens; and
    performing Latent Semantic Analysis (LSA) using the one or more sub-phrases.

8. The non-transitory computer-readable medium of claim 7, wherein the plurality of noun tags comprises:

a noun tag for a proper noun that is a geographic name;
a noun tag for a proper noun that is a name of a person; and
a noun tag for a proper noun that is can be both a geographic name and a name of a person.

9. The non-transitory computer-readable medium of claim 7, wherein clustering one or more of the created tokens into the chunk of tokens comprises clustering tokens having the same noun tags into the chunk of tokens.

10. The system of claim 1, wherein the phrase is an undifferentiated block of nouns.

11. The system of claim 2, wherein the plurality of noun tags further comprises a noun initial tag for an initial that is part of a person's name.

12. The system of claim 2, wherein clustering one or more of the created tokens into the chunk of tokens comprises utilizing a set of rules stored in the one or more memory units.

13. The system of claim 11, wherein the set of rules comprises a rule instructing that if the plurality of tokens includes two adjacent tokens with identified noun tags in a specified order, replace the noun tags with another noun tag that contains the noun tags of the two adjacent tokens.

14. The system of claim 11, wherein the set of rules comprises a rule instructing that if the plurality of tokens includes three adjacent tokens with identified noun tags in a specified order, replace the noun tags with another noun tag that contains the noun tags of the three adjacent tokens.

15. The computer-implemented method of claim 4, wherein the phrase is an undifferentiated block of nouns.

16. The computer-implemented method of claim 5, wherein the plurality of noun tags further comprises a noun initial tag for an initial that is part of a person's name.

17. The computer-implemented method of claim 16, wherein clustering one or more of the created tokens into the chunk of tokens comprises utilizing a set of rules stored in the one or more memory units.

18. The non-transitory computer-readable medium of claim 7, wherein the phrase is an undifferentiated block of nouns.

19. The non-transitory computer-readable medium of claim 8, wherein the plurality of noun tags further comprises a noun initial tag for an initial that is part of a person's name.

20. The non-transitory computer-readable medium of claim 19, wherein clustering one or more of the created tokens into the chunk of tokens comprises utilizing a set of rules stored in the one or more memory units.

* * * * *